Feb. 14, 1961    A. E. JOHNSON    2,972,096
PROTECTION OF A TEMPERATURE SENSITIVE DEVICE
Filed Nov. 26, 1957
FIG. 1
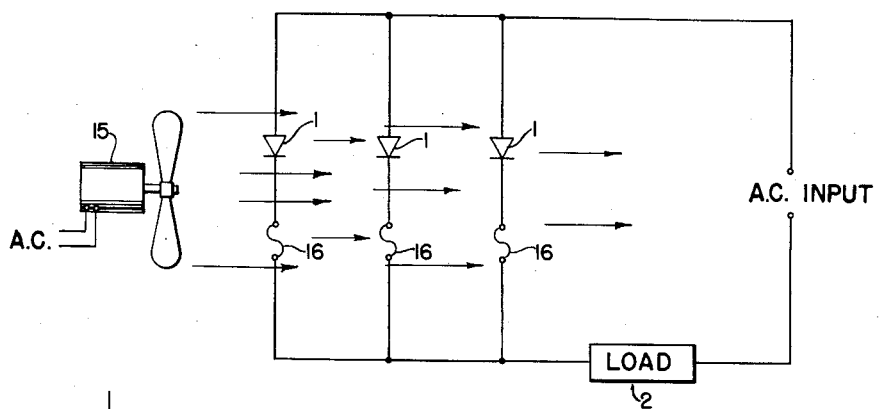
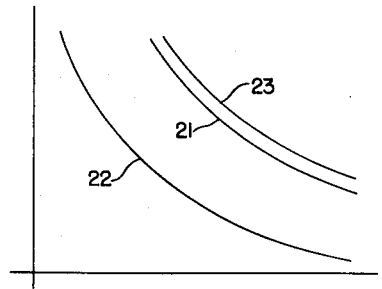
FIG. 4
FIG. 2
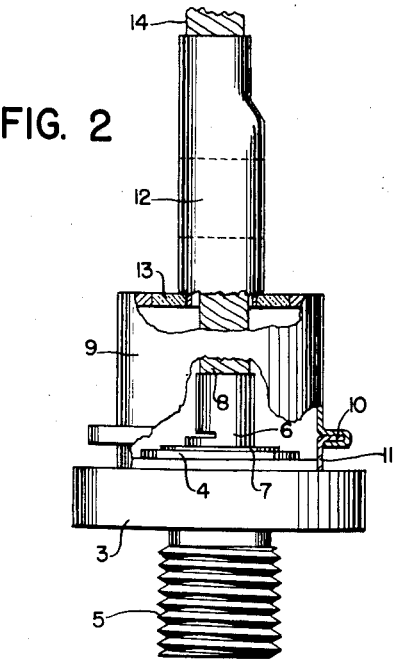
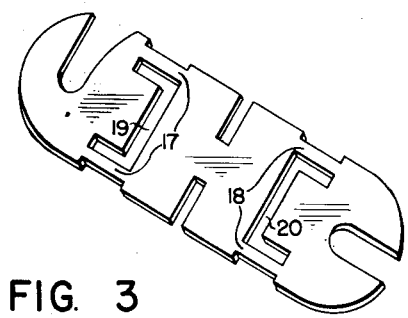
FIG. 3
*INVENTOR.*
ARTHUR E. JOHNSON
BY
*Andrus, Scealu & Starke*
Attorneys

2,972,096
PROTECTION OF A TEMPERATURE SENSITIVE DEVICE

Arthur E. Johnson, Elkhorn, Wis., assignor to A. O. Smith Corporation, Milwaukee, Wis., a corporation of New York Filed Nov. 26, 1957, Ser. No. 699,014

5 Claims. (Cl. 321—14)

This invention relates to the protection of temperature sensitive devices and particularly to the protection of solid-state rectifying elements which have a low internal thermal capacity.

Solid-state rectifying devices, which are adapted to change an alternating current to a direct current, are finding increased application in commercial practice because of their low cost and long life. Generally, solid-state rectifying elements have a low internal thermal capacity and sufficient heat is generated internally within a few cycles of an appreciable overload current to destroy the element. Consequently, each element is fused to interrupt the current therethrough incident to an overload current.

The conventional metal mass-type fuse does not respond sufficiently rapidly to protect the element because the internal thermal capacity of a fuse rated for normal load current is greater than that of the rectifying element.

Special quick-acting fuses have been developed and are used to protect the rectifying element. However, the fuses are generally of a complex construction and correspondingly expensive.

The present invention provides a low-cost, rapidly actuated and reliable fuse for temperature sensitive rectifying elements and the like.

In accordance with the present invention, a heat disruptable mass, such as the conventional metal strip fuse, is connected in series with the temperature sensitive devices. The heat generated internally by the load current in the respective member is proportional to the magnitude of the load current. The internal heat capacity of the fuse is selected to be less than the internal heat capacity of the device to be protected. A conventional fuse mass having an internal thermal capacity related to the device in the above manner will not normally have the capacity to continuously carry the rated load current.

In accordance with the present invention, a cooling means is associated with the fuse to dissipate the heat generated by normal current flow and prevent actuation of the fuse thereby. During a period of overload current, the initial heat rise internally of the respective members is so rapid that the fuse acts as if the cooling means were removed. As the internal capacity of the fuse is less than that of the temperature sensitive device being protected, the circuit is interrupted within the maximum current overload period of the device and current flow stops before damage to the device can occur.

The present invention provides a reliable and inexpensive fuse system suitable for highly temperature sensitive devices wherein the relative internal heat capacity of the fuse and the temperature sensitive device is utilized to positively open the circuit.

The drawing furnished herewith illustrates the best mode presently contemplated by the inventor for carrying out the invention.

In the drawing:

Figure 1 is a schematic circuit diagram of a half-wave rectifier assembly;

Fig. 2 is an elevational view of a solid state germanium rectifying unit with parts broken away to show portions of the internal construction;

Fig. 3 is a perspective view of a simple metal strip fuse for connection with a rectifying unit; and Fig. 4 is a view of generally representative overload time response curves for the rectifying unit and fuse.

Referring to the drawing and particularly Fig. 1 thereof, three half-wave rectifiers 1 are connected in parallel with each other and in series with a load 2 across a suitable source of alternating current, not shown. The half wave rectifiers 1 are similarly polarized with respect to the load 2 to allow alternate half cycles of the current input to flow and to thereby supply a pulsating direct current to the load 2.

Each rectifying assembly 1 is any conventional variety. The present invention is particularly adapted to the protection of solid state rectifying devices having a low internal thermal capacity, such as the conventional germanium rectifier.

Referring to Fig. 2, a commercially available germanium half-wave rectifier is illustrated. This rectifier comprises a metal mounting plate 3 having a germanium rectifying wafer 4, shown substantially enlarged, soft soldered or otherwise secured in intimate electrical connection to the upper surface of the mounting plate which serves as a heat sink for the heat generated by current flow through the wafer 4. A threaded stud 5 extends from the opposite surface of the mounting plate 3 and constitutes a means for mounting the plate in electrical connection upon a suitably apertured or recessed connector, not shown. A connector 6 is provided with a current-collecting disc-like portion 7 which is soft soldered or othewise suitably secured to the opposite surface of the wafer 4. A small jumper lead 8 is clamped within the connector 6 and constitutes the opposite terminal of rectifying unit. An inverted cup-shaped housing 9 is disposed over connector 6 and the wafer 4 and is clamped at its lower end to a rim or flange 10 of a tubular mounting plate extension 11 surrounding the wafer 4 to prevent oxidization and contamination of the wafer and to dissipate the heat generated by current flow through the wafer. The lead 8 is secured at its opposite end to a tubular connector 12 secured within an opening in the housing by a suitable insulating material 13 such as glass. A terminal connecting lead 14 is crimped within the opposite end of the tubular connector to allow connection in a rectifying circuit.

The thermal capacity of the wafer 4 is generally quite low and suitable forced cooling means such as a fan 15 is provided, as generally illustrated in Fig. 1. The fan 15 forces air to continuously pass over the rectifying elements 1 and thereby carry away the heat generated therein.

A separate fuse 16 is serially connected with each individual rectifying wafer 4 to protect against a sustained overload current which generates more heat than can be carried away by the cooling air. The fuse 16 is a conventional fuse having a heat disruptable mass adapted to be connected in series with the rectifying wafer 4.

Referring to Fig. 3, a standard flat zinc-type strip fuse is illustrated having two pairs of relative thin fusible portions 17 and 18 of reduced cross-section, formed by respective U-shaped windows 19 and 20. If an overload current is maintained for a predetermined period, the thin fusible portions 17 and 18 are rapidly melted by the heat generated therein and interrupts the flow of current through the fuse 16. This opens the circuit through the corresponding rectifying unit 1 and prevents destruction of the unit. Such a fuse is a current-time rated device; that is, permits an overload current for a predetermined period after which time the mass melts to break the circuit.

The fuse 16 is selected to have a maximum internal heat capacity which is less than that of the rectifying wafer 4. The conventional self-disrupting fuse cannot carry the rated current of the rectifying circuit and still have an internal thermal capacity less than that of the wafer 4.

In accordance with the present invention, the fuse 16 is disposed within the path of the cooling air from the fan 15. During normal operation, the relatively large mass of metal in the fuse carries the heat generated rapidly into the path of cooling air. The cooling air carries away the heat generated within the fuse by normal current flow and maintains the temperature of the fuse material below the disrupting temperature therefor.

Referring to Fig. 4, generally representative current overload curves are shown as they would appear with time in cycles of current as the ordinate on a semi-logithrimic scale and percent of full load rated current as the abscissa on a direct scale.

The curve 21 represents the overload curve of a germanium rectifier and the curve 22 represents the overload curve of a fuse link having a smaller internal heat capacity than the rectifier. By disposing the fuse link in the path of the cooling air, the overload characteristic becomes such as to be represented by the curve 23—lying above the overload curve of the air-cooled germanium rectifier.

During an overload period, however, the air cooling is effectively removed and the fuse link is then characterized by the overload curve 22 because the heat rise which occurs internally of the fuse, and also of the rectifying wafer 4, is so rapid that it does not have an opportunity to pass outwardly through the body of the respective member and into the path of the cooling air. The heat rise is sufficiently rapid because the heat generated is proportional to the square of the current flowing through the device. Thus on any appreciable overload current, a substantial increase in heat is rapidly established.

As the internal thermal capacity of the fuse 16 is less than that of the rectifying wafer 4, the fuse 16 responds within the maximum overload operating time of the rectifying wafer and interrupts the circuit.

An example of an actual structure which has been made in accordance with this invention follows. A 200 ampere rated fuse was serially connected with a 333 average ampere germanium junction or wafer. Fixed air cooling was employed and the fuse operated to positively protect the junction against damaging overload currents.

The present invention provides a circuit for the reliable protection of temperature sensitive devices, such as solid-state rectifying elements, by the means of inexpensive and readily available fuse elements.

Various modes of carrying out the invention are contemplated as being within the scope of the following claims particularly pointing out and distinctly claiming the subject matter which is regarded as the invention.

I claim:

1. In an electrical circuit including, a temperature sensitive device having a low internal thermal capacity and adapted to carry a normal circuit current, a heat disruptable mass serially connected with said device and having a smaller internal thermal capacity than said device, and cooling means to cool said mass and allow normal circuit current to flow therethrough, said heat disruptable mass being characterized by internal heating of said mass essentially independent of said cooling means during the maximum operating overload period of said temperature sensitive device whereby said fuse interrupts the circuit within the overload period of the temperature sensitive device.

2. In a rectifying circuit employing a temperature sensitive rectifying element to convert an alternating current to a direct current, a heat triggered fuse mass serially connected with the rectifying element and having an internal thermal capacity less than said rectifying element, and cooling means operatively associated with the fuse mass to cool the mass and prevent triggering thereof by the rated load current, said mass being selected with a characteristic providing internal heating of said mass essentially independent of said cooling means during the maximum operating overload period of the temperature sensitive rectifying element whereby said fuse interrupts the circuit within the overload period of the temperature sensitive device incident abnormal overload current flow during this period.

3. In a rectifying circuit employing a solid-state rectifying element to change an alternating current to a direct current, a metal strip fuse link serially connected with the rectifying element, a heat sink integrally formed with said strip link to dissipate heat generated within the link, said fuse link having an internal thermal capacity less than said rectifying element, and cooling means operatively associated with the fuse link and said heat sink to dissipate the heat generated by current flow therethrough and to increase the average current rating thereof over a substantial period of current flow, the fuse link establishing internal heating independently of the cooling means during the maximum operating overload period of the solid state rectifying element and having the momentary current rating thereof substantially uneffected by the cooling means.

4. A rectifying circuit employing a solid-state rectifying element, which comprises cooling means adapted to carry away the heat generated by current through said elements, a triggering fuse link serially connected with said rectifying element and having an internal thermal capacity smaller than said element and having a mass characteristic establishing internal heating of the mass essentially independent of the cooling means during the initial maximum operating overload period of said solid state rectifying element whereby said fuse link is disrupted within the maximum overload period of said rectifying element, and means operatively associating said cooling means and said fuse means to effectively carry away only the heat generated by normal current flow and to allow the fuse to act independently thereof during predetermined overload currents.

5. In a rectifying circuit employing germanium rectifying elements, air-cooling means operatively associated with the rectifying means to pass cooling air over the means to dissipate the heat generated by current in the rectifying means, and strip fuse means serially connected one each with each rectifying element and having a smaller internal thermal capacity than said elements and having a mass characteristic establishing heating of the strip fuse means essentially independent of said cooling means during the maximum operating overload period of said germanium rectifying elements, said fuse being disposed in the path of said cooling air to dissipate the heat generated by normal current flow through the fuse, said fuse acting effectively independently of said cooling air during passage of predetermined overload currents to open the circuit within the maximum overload operating period of the associated element incident to corresponding overload currents.

References Cited in the file of this patent

UNITED STATES PATENTS

| | | |
|---|---|---|
| 1,959,513 | Weyandt | May 22, 1934 |
| 2,112,093 | Harty | Mar. 22, 1938 |
| 2,125,110 | Harty | July 26, 1938 |
| 2,327,511 | De Lange et al. | Aug. 24, 1943 |

FOREIGN PATENTS

| | | |
|---|---|---|
| 120,804 | Australia | Jan. 24, 1946 |